US012657608B2

(12) United States Patent
Daniel et al.

(10) Patent No.: US 12,657,608 B2
(45) Date of Patent: *Jun. 16, 2026

(54) PERSONA AGGREGATION AND INTERACTION SYSTEM

(71) Applicant: SLCKET, Inc., Overland Park, KS (US)

(72) Inventors: Jeffrey Christopher Daniel, Columbia, MO (US); Manzilla Queen, Kansas City, MO (US); Tariq Adawi, Rolla, MO (US)

(73) Assignee: SLCKET, Inc., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,217

(22) Filed: Apr. 22, 2024

(65) Prior Publication Data

US 2024/0273576 A1     Aug. 15, 2024

Related U.S. Application Data

(63) Continuation of application No. 16/682,042, filed on Nov. 13, 2019, now Pat. No. 11,995,687, which is a
(Continued)

(51) Int. Cl.
G06F 3/048      (2013.01)
G06F 3/0481      (2022.01)
(Continued)

(52) U.S. Cl.
CPC ....... G06Q 30/0269 (2013.01); G06F 3/0481 (2013.01); G06F 3/04847 (2013.01);
(Continued)

(58) Field of Classification Search
CPC ........... G06Q 30/0269; G06Q 30/0214; G06Q 30/0255; G06Q 50/01; G06F 3/0481; G06F 3/04847; H04L 51/02; H04L 51/52
See application file for complete search history.

(56) References Cited

U.S. PATENT DOCUMENTS 9,600,297 B1 *  3/2017  Buyukkokten ...... G06Q 10/107
10,019,133 B1 *  7/2018  McNeill ................ H04L 51/046
(Continued)

*Primary Examiner* — Thanh T Vu

(74) *Attorney, Agent, or Firm* — Erise IP, P.A.

(57) ABSTRACT

A persona aggregation and interaction system comprising a consolidation engine, a persona engine, an interface engine, an interaction engine, and a reward engine. The consolidation engine is configured for acquiring external information regarding various entities from various platforms. The persona engine is configured for aggregating said external information to create a persona associated with multiple platforms. The interface engine is configured to display to a user a first persona icon associated said first persona. The interface engine invites the user to select the first persona icon to view said first persona. The interaction engine is configured to present the user with an option to interact with the first persona and receive an indication of interactions by the user. The reward engine is configured for providing the user with an incentive based upon said indication of interaction.

20 Claims, 6 Drawing Sheets

Related U.S. Application Data continuation of application No. 15/165,548, filed on May 26, 2016, now Pat. No. 10,497,026.

(51) Int. Cl.

| | |
|---|---|
| *G06F 3/04847* | (2022.01) |
| *G06Q 10/40* | (2026.01) |
| *G06Q 30/0214* | (2023.01) |
| *G06Q 30/0251* | (2023.01) |
| *H04L 51/02* | (2022.01) |
| *H04L 51/52* | (2022.01) |

(52) U.S. Cl.
CPC ......... *G06Q 10/40* (2026.01); *G06Q 30/0214* (2013.01); *G06Q 30/0255* (2013.01); *H04L 51/02* (2013.01); *H04L 51/52* (2022.05)

(56) References Cited

U.S. PATENT DOCUMENTS

| | | | |
|---|---|---|---|
| 10,365,796 B1* | 7/2019 | Blackman | G06T 13/80 |
| 2004/0250217 A1* | 12/2004 | Tojo | G06F 3/0482 |
| | | | 715/845 |
| 2013/0006738 A1* | 1/2013 | Horvitz | G06Q 30/0207 |
| | | | 705/14.39 |
| 2014/0237378 A1* | 8/2014 | Gonen | H04M 1/724 |
| | | | 715/745 |
| 2016/0277346 A1* | 9/2016 | Xu | H04M 1/724631 |
| 2017/0255681 A1* | 9/2017 | Giunio-Zorkin | G06Q 50/01 |
| 2020/0380599 A1* | 12/2020 | Wasser | G06Q 40/00 |

* cited by examiner

PERSONA AGGREGATION AND INTERACTION SYSTEM

RELATED APPLICATION

This application is a continuation patent application and claims priority benefit, with regard to all common subject matter, of earlier-filed U.S. patent application Ser. No. 16/682,042, filed Nov. 13, 2019, entitled "PERSONA AGGREGATION AND INTERACTION SYSTEM" ("the '042 application"). The '042 application is a continuation patent application and claims priority benefit, with regard to all common subject matter, of earlier-filed U.S. patent application Ser. No. 15/165,548, filed May 26, 2016, entitled "PERSONA AGGREGATION AND INTERACTION SYSTEM," now U.S. Pat. No. 10,497,026 issued Dec. 3, 2019 ("the '026 patent"). The above-referenced patent application and patent are hereby incorporated by reference into the present application in its entirety.

BACKGROUND

1. Field

Embodiments of the invention are broadly directed to the aggregation and integration of information from various computerized platforms.

2. Related Art

A modern individual typically interacts with numerous different types of computerized systems. These systems can include social media platforms, e-mail systems, calendar systems, news systems, healthcare systems, financial systems, and the like. In most of these systems, the individual has disparate accounts and profiles. What is lacking in the prior art is a system to consolidate these disparate accounts and profiles into a single persona for the individual.

Similarly, these systems typically employ a feed-style information display. The feed displays content by applying an algorithm to determine what content to display, what content to hide, what order to display the content in, and what ads to display alongside the content for revenue generation. These algorithms have a tendency to hide or bury desired content. These algorithms also fail to consolidate the content with its creator, such that algorithm displays content from a single creator separately.

These systems typically generate revenue through the display of ads within the feed. This is disadvantageous for a few reasons. First, the advertisements are easily ignored by the user. Second, the advertisements provide no feedback to the advertiser, other than a click-through rate. The click-through rate does not provide any valuable information about the user themselves. Third, the ads provide no incentive for the user to interact with or share the advertisement. Advertisements are therefore typically seen by the user as an inconvenience taking up screen space from the desired content. What is therefore lacking in the prior art is a new method of revenue generation that provides feedback for the advertiser and encourages the user to interact with the advertisement.

SUMMARY

Embodiments of the invention solve the above-mentioned problems by providing a persona interaction system. The persona interaction system gathers information from multiple platforms about multiple persons. The persona interaction system then aggregates this information into personas, each indicative of a single person's presence across the multiple platforms. The user is then invited to interact with the various personas. Upon interaction, the user is presented with incentives to encourage the interaction.

A first embodiment of the invention is broadly directed to a persona aggregation system comprising a consolidation engine, a persona engine, an interface engine, an interaction engine, and a reward engine. The consolidation engine is configured for acquiring external information. The consolidation engine is configured to receive said external information from a first platform that is associated with a first entity and a second entity. The consolidation engine is also configured to receive said external information from a second platform that is associated with said first entity and said second entity. The persona engine is configured for aggregating said external information from said first platform and said second platform. The persona engine is configured to create a first persona associated with said first entity and to create a second persona associated with said second entity. The interface engine is configured to display to a user a first persona icon associated said first persona and a second persona icon associated with said second persona. The interface engine invites the user to select the first persona icon to view said first persona. The interaction engine is configured to present the user with an option to interact with the first persona and receive an indication of interactions by the user. The reward engine is configured for providing the user with an incentive based upon said indication of interaction.

A second embodiment of the invention is broadly directed to a persona aggregation system comprising a consolidation engine, a persona engine, an interface engine, an interaction engine, and a reward engine. The consolidation engine is configured for acquiring external information regarding various entities from various platforms. The persona engine is configured for aggregating said external information to create a personas associated with multiple platforms. The interface engine is configured to display to a user a first persona icon associated said first persona. The interface engine invites the user to select the first persona icon to view said first persona.

A third embodiment of the invention is broadly directed to a user reward system comprising an interaction engine and a reward engine. The interaction engine is configured to present the user with the option to interact with a first persona. The interface engine receives an indication of interactions by the user. The reward engine is configured for performing steps including: providing the user with an incentive to reward the user for said interactions; displaying the incentive on a user device; presenting to the user an option to share the incentive with a second person that is associated with the user; determining that the user is likely to be interested in the incentive because the user shared the incentive and because the user utilized the incentive; and determining that the second person is likely to be interested in the incentive because the user chose to share the incentive with the second person.

Still other embodiments of the invention are directed to a non-transitory computer readable medium having a computer program thereon. The computer program instructs at least one processing element to perform the steps discussed herein. Yet further embodiments of the invention are directed to a computerized method of performing the steps discussed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
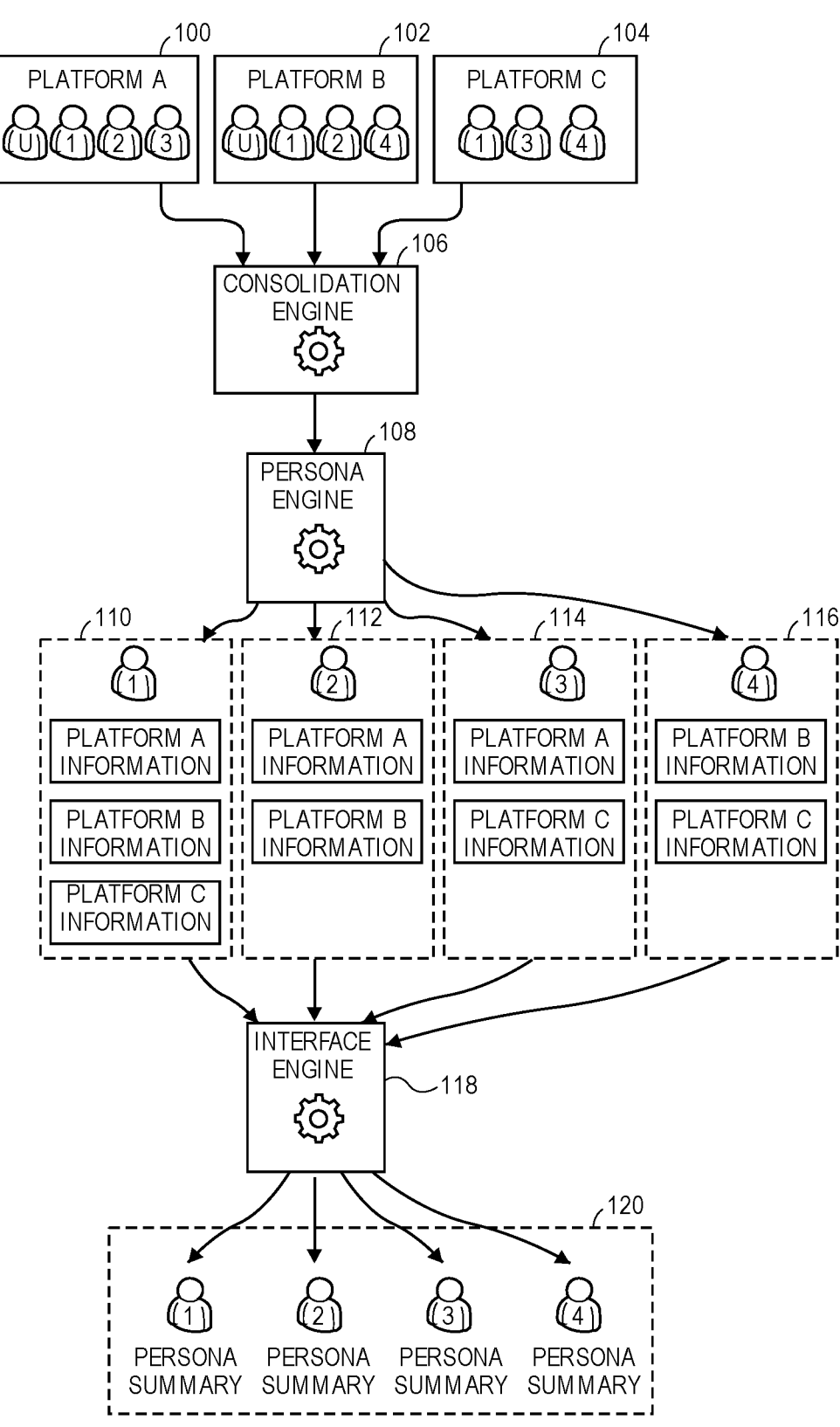
FIG. 1 is a flow diagram illustrating an exemplary embodiment of a persona aggregation system.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The invention provides various embodiments of a computer program, a method, and a system for engaging a user. Embodiments of the invention, such as illustrated in FIGS.

1 and 2, are directed to a persona aggregation system comprising a consolidation engine, a persona engine, an interface engine, an interaction engine, and a reward engine. The consolidation engine is configured for acquiring external information regarding various entities from various platforms. The persona engine is configured for aggregating said external information to create personas associated with multiple platforms. The interface engine is configured to display to a user a first persona icon associated with said first persona. The interface engine invites the user to select the first persona icon to view said first persona. The interaction engine is configured to present the user with an option to interact with the first persona and receive an indication of interactions by the user. The reward engine is configured for providing the user with an incentive based upon said indication of interaction. The steps performed by each of these engines is discussed in depth below.

Most of the following detailed description is broadly directed to the social media field as an exemplary field of use for the invention. In the social media field, the user is often a user that connects to or is associated with multiple social media platforms. A few terms relative to the exemplary social media field will be discussed for clarity. The user is typically the person that is accessing the system. The user may represent themselves, a principle for which they are an agent, a character or other personage, a corporation, a non-profit organization, a government body, or other organization. A platform is a computerized network or resource. In the social media context, the platform may be a social media service or program. Embodiments of the invention may also be considered platforms.

The user accesses the system via a user device. The user device may be any type of computing device, such as a desktop computer, a laptop computer, a tablet computer, a smart phone, a wearable technology, or other computing device. These various devices are discussed more below. The client device may have a non-transitory computer readable medium thereon with a computer program stored thereon. The computer program instructs at least one processor to perform the discussed steps. The user may also utilize more than one user device, of more than one type, to access the system at various times.

Turning to the figures, FIG. 1 is broadly directed to an exemplary embodiment of the invention. FIG. 1 broadly depicts data from various different platforms being consolidated and aggregated into personas. The various platforms each contain data for various users of their respective systems. FIG. 1 shows how this data is accessed, analyzed, organized, prioritized, and customized for the user. FIG. 1 generally illustrates the steps performed by a consolidation engine, a persona engine, and an interface engine.

The consolidation engine retrieves, accesses, gathers, captures, or otherwise acquires information from other platforms. The consolidation engine performs the functions to gather information to fill the personas (which are created by the persona engine discussed below). The consolidation engine therefore may periodically, automatically, or continuously access the other platforms, receive information from the other platforms, etc.

In Step 100, the consolidation engine accesses or otherwise acquires information from Platform A. Platform A may be a social network or other computerized network. Platform A may include information for various people and organizations. In the example shown in Step 100, Platform A includes information for the user, Person 1, Person 2, and Person 3. The information for each person and user can include account information for that person, postings, profile information, original content by the person, and other similar information.

In Step 102, the consolidation engine accesses or otherwise acquires information from Platform B. In the example shown in Step 102, Platform B includes information for the user, Person 1, Person 2, and Person 4. Platform B may be another social network, or another type of platform. For example, the various platforms A-C may be each of the same type, or they may be of different types. In some embodiments of the invention, the personas may be multi-faceted to include information for the person (as discussed below) that reflect more than the social media aspects of the person.

In Step 104, the consolidation engine accesses or otherwise acquires information from Platform C. In the example shown in Step 104, Platform C includes information for Person 1, Person 3, and Person 4. Platform C includes no information for the user. This may be a platform which the user does not participate in, or may be a platform in which the user's information is secret or secured, such that it is not shared with the consolidation engine. In this way, the consolidation engine can provide a more robust and well-rounded persona for each person. For example, even if the user does not have a TWITTER account, the consolidation engine may access TWITTER data to enhance the other personas.

In Step 106, the consolidation engine receives and analyzes the information gathered, as discussed above in Steps 100-104. The consolidation engine may also periodically or continuously continue to access the various platforms to receive new information as it is entered into, shared with, or created by that platform. In some instances, the various platforms may also push new data to the consolidation engine. This allows the consolidation engine to remain substantially up-to-date with the information available. This keeps the personas updated and current.

In embodiments of the invention, the consolidation engine utilizes an application programming interface ("API") to access data from at least one platform. The API allows the consolidation engine to essentially incorporate functionality from the platform into the consolidation engine and the persona engine (as discussed below). The API allows the consolidation engine to access specific data that exists on the platform, such as data relevant to the respective users. The API contacts, requests, and retrieves data directly from the platform. Typically, an API will also allow the consolidation engine (and/or the interaction engine discussed below) to write data to the platform. Many platforms therefore include an API because the platform itself is also improved by allowing access to the platform.

In Step 108, the information from the consolidation engine sends information to the persona engine. In Step 108, the persona engine analyzes the various data provided from the consolidation engine. The persona engine recognizes, differentiates, and categorizes information according to the person or organization to which it relates in the real world. For example, the persona engine may identify all of the available data from a certain person across the various platforms and consolidate this information into a persona.

In embodiments of the invention, the persona is a digital representation of the person as it is represented across the various platforms. The persona may give a snapshot of the digital and social activities of the person, in a convenient and aesthetically pleasing way, as discussed below. The persona allows the user to view these various activities, postings, and other data together. The persona also consolidates the various platforms such that trends can be observed and the advantages of the various platforms can be observed.

In Step 110, the persona engine creates a persona for Person 1. As discussed above, Person 1 had information present on Platform A, Platform B, and Platform C. This information is then consolidated, organized, and presented as a coherent unit for the user. The user is able to see information posted by or about Person 1 across the various platforms in one location on the system. In other systems of the prior art, the user would have to access each platform individually.

In Step 112, the persona engine creates a persona for Person 2. As discussed above, Person 2 had information present on Platform A and Platform B. In Step 114, the persona engine creates a persona for Person 3, based upon information from Platform A and Platform C. In Step 116, the persona engine creates a persona for Person 4, based upon information from Platform B and Platform C.

As illustrated in FIG. 1, each persona is a distinct set of data that may include information from various platforms. The persona therefore allows the user to view the information relevant to the respective person across the platforms in one single location. It should also be appreciated that in embodiments of the invention, the personas are not static, but are a fluid and dynamic representation of the current (or substantially current) activity of the person on the various platforms.

For example, in some embodiments of the invention, Platform A, Platform B, and Platform C are all social media networks. Platform A may be FACEBOOK, Platform B may be TWITTER, and Platform C may be INSTAGRAM. The consolidation engine interacts with the API of FACEBOOK, the API of TWITTER, and the API of INSTAGRAM to retrieve information therefrom. This allows the persona created to include a snapshot of all social media activity for the person aggregated into one location. As such, the user accessing the persona can see what the person has been doing across the various social media platforms without having to specifically access each platform individually.

Figure 4:
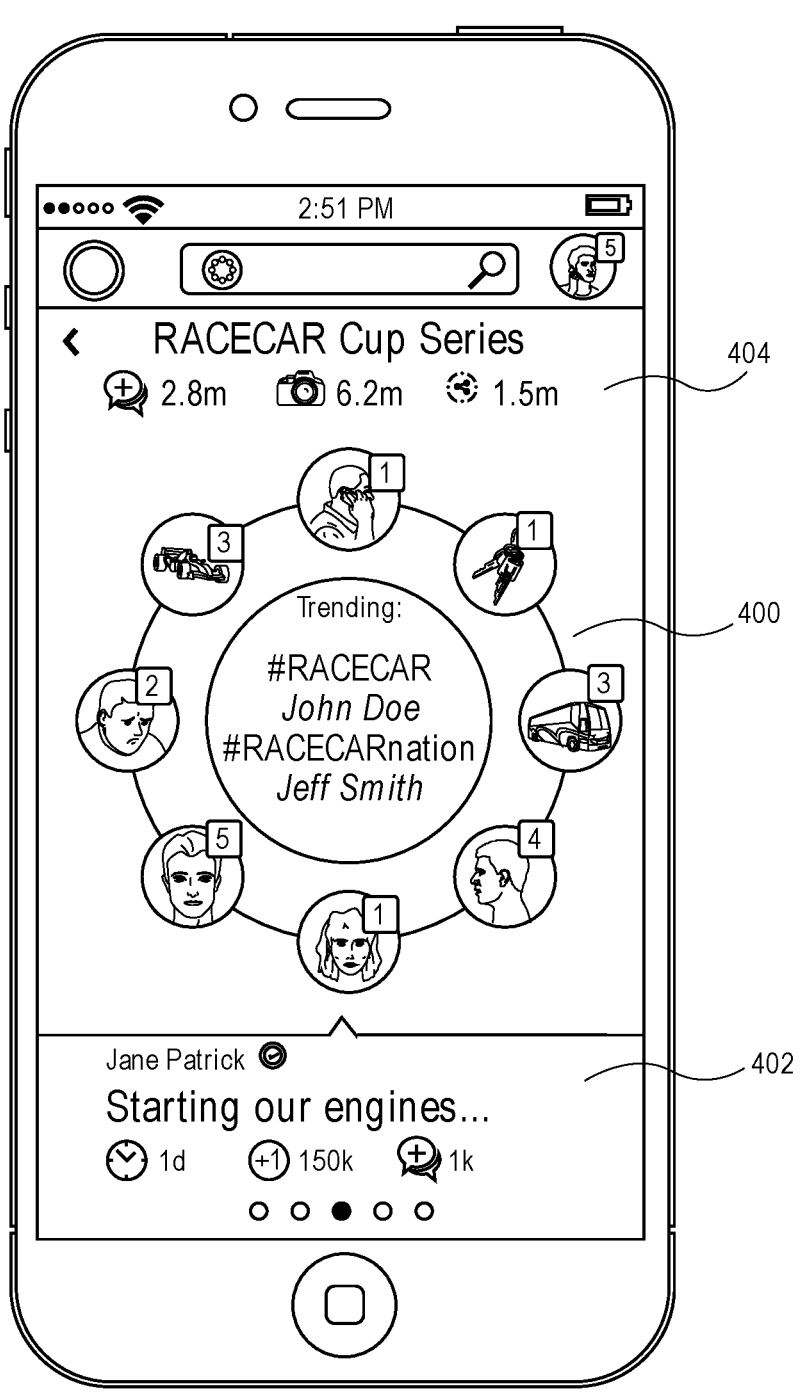
FIG. 4 is an exemplary depiction of a graphical user interface of the graphical wheel as displayed on a smart phone.
Figure 5:
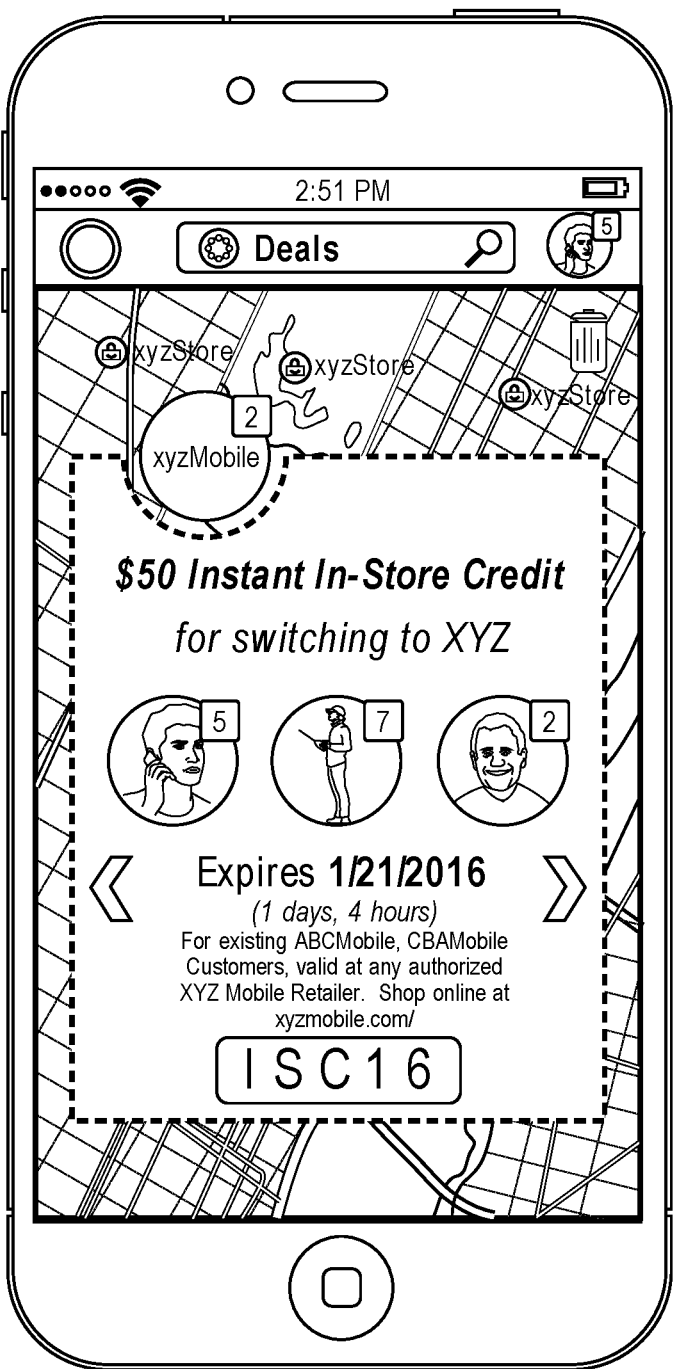
FIG. 5 is an exemplary depiction of a graphical user interface of a discount reward presented to a user on the smart phone.

In Step 118, the personas are sent to or otherwise acquired by the interface engine. The interface engine presents the personas and other information to the user. The interface engine includes a graphical user interface ("GUI") as discussed below that displays the personas to the user. The GUI may take on any of numerous different forms and aesthetics, such as illustrated in FIGS. 4 and 5. The interface engine may create an indication of the persona, such as a persona icon, to display to the user on the GUI. The user may then select the persona icon to see a graphical depiction of the persona. The persona can include the data captured by the consolidation engine, photos, pictures, statuses, and other information.

Figures 3A, 3B, 3C:
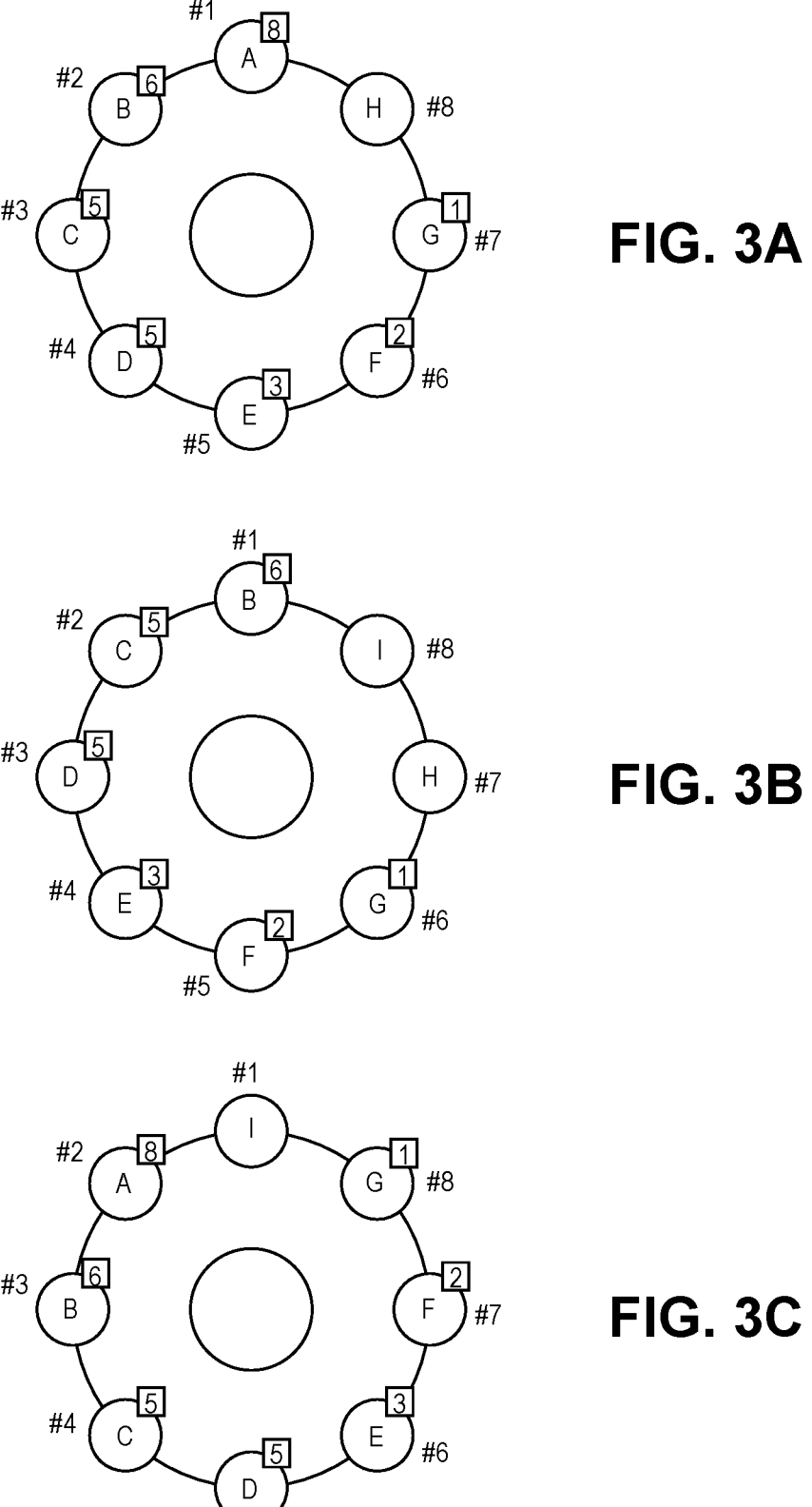
FIGS. 3A-3C are each visual diagrams illustrating a graphical wheel for the display of persona icons.

In Step 120, the interface engine displays the personas to the user on the GUI. The interface engine may also access and analyze user device information, as discussed below. In some embodiments of the invention, the personas are displayed to the user via a graphical wheel, as shown in FIGS. 3A-3C. FIGS. 3A-3C illustrate an exemplary method of displaying personas. As opposed to common methods of the prior art, such as a display of an alphabetical list of user accounts, the wheel method allows for active, new, and interesting content to be displayed, without using a standard algorithm to select content.

FIGS. 3A-3C each display an exemplary wheel and show how embodiments of the invention allow the user to navigate through the wheel. Each wheel includes 8 persona locations, labeled #1-#8. The persona location numbers are not displayed to the user, but are illustrated for clarity. It should be noted that the persona location in each of FIG. 3A-3C are static, while the persona icon displayed therein can change based upon the user interacting with the wheel, based upon new information made from the consolidation engine, or based upon other considerations. Each exemplary wheel also includes a central display, a persona icon in each persona location, and a notification indication on at least one persona icon.

It should also be appreciated that 8 persona locations are used in FIGS. 3A-3C as an exemplary number of persona locations. In embodiments of the invention, more or fewer persona locations may be used, such as 4, 5, 6, 7, 9, 10, 12, 15, 20, etc. In some embodiments, the number of persona locations may vary based upon different factors. For example, if the user is accessing the system while on a tablet computer, the system may display more persona locations than when the user accesses the system from a smart phone. This is because the tablet computer will typically have a larger screen that can accommodate more persona locations. In some embodiments, the user may be able to select the number of displayed persona locations. In some embodiments, the number of persona locations may be determined by the number of personas that include new information.

FIG. 3A illustrates an exemplary embodiment of a first state of the wheel that is displayed to the user by the interface engine. It should be appreciated that FIG. 3A is one example of the personas displayed in Step 120 in FIG. 1. Other display methods and display layouts may additionally or alternatively be used. FIG. 3A shows a Persona A displayed in persona location #1, B in #2, C in #3, D in #4, E in #5, F in #6, G in #7, and H in #8. Persona A includes a notification indication that there are 8 associated notifications for Persona A. The notification indications are discussed more below.

FIG. 3B illustrates an exemplary embodiment of a second state of the wheel after the user swipes the wheel in a clockwise direction from wheel displayed in FIG. 3A. In this embodiment, by swiping the wheel clockwise, the wheel hides Persona A, such that Persona B is now showing in persona location #1. Hiding Persona A and shifting all of the personas clockwise allows the system to display a new persona, Persona I, in persona location #8. This allows the user to scroll through the personas to see all personas. In these embodiments, instead of scrolling down to view additional content, the user scrolls in a clockwise or counter-clockwise fashion to view additional content. This allows the displayed wheel to remain static, while allowing the content displayed thereon to change. This is aesthetically pleasing and convenient. It should also be appreciated that the user could continue to scroll in the clockwise direction so as to continue to hide personas and reveal new personas. For example, upon a subsequent scrolling in the clockwise direction, the wheel would hide Persona B and show a new Persona J (not illustrated). In this way, the user could quickly scroll through the available personas to see a quick snapshot of the available content for them to view and possible interactions for them to make.

FIG. 3C illustrates an exemplary embodiment of a second state of the wheel after the user swipes the wheel in a counter-clockwise direction from wheel displayed in FIG. 3A. In this embodiment, the wheel hides Persona H and reveals Persona I at persona position #1. In this way, the user can see the most active or current personas (A, B, C, etc.) while also seeing new personas not currently displayed. By allowing the user to scroll both clockwise and counterclockwise, it allows the user to customize how that are being shown information. In other embodiments, the wheel may only turn in the clockwise or counterclockwise direction.

An exemplary GUI is shown in FIG. 4, as may be displayed on a smart phone. FIG. 4 includes a wheel 400, such as discussed above, a notification preview 402, and a wheel statistics area 404. The wheel 400 shows the personas that are relevant to the wheel. The notification preview 402 shows at least a portion of the data contained within the wheel. The notification preview 402 may show the most recent information, the information related to a persona selected by the user, a preview of the persona, a summary of the persona, or the like. The wheel statistics area 404 shows overall information for the wheel, such as the number of total notifications, total number of personas, total number of views, total number of photographs, total number of status updates, total number of interactions, and other statistics for the wheel.

As displayed in FIGS. 3A-3B, each persona icon may include a notification indication. The notification indications are illustrated in the top-right corner of each persona location. The notification indication may include a number that is indicative of the number of new data sets that are present within the persona. "New" data may be new since the last time the user looked at the persona, new since the last time the user interacted with the persona, new for a given time period (such as new for the day, new within two days, new within a week, etc.), or the like. In some embodiments, the notification indication may present other information as well. For example, the color of the notification indication and/or the number therein may give an indication of how new the newest data set is. For example, if the persona includes only one update, but the update was published within the last hour, the notification indication may be red. As another example, if the persona includes eight updates, and one of the updates was within the last 4 hours, the notification indication may be yellow. If the persona includes twenty updates, but all are more than a day old, the notification indication may be black. This gives the user a quick indication of what types of data are available for view within that persona to help the user decide whether to select that persona.

As displayed in FIGS. 3A-3B, each persona icon may include a central display. The central display may include information related to at least one persona icon. For example, upon a single press or hover over a persona icon, the central display may show a summary, synopsis, or latest updated from the selected persona. In some embodiments, the central display may show said information related to the persona icon currently in persona location #1. The central display may additionally or alternatively show a name, picture, or other indication related to that specific graphical wheel. For example, the user may have a graphical wheel for showing family, a graphical wheel for showing friends, and a graphical wheel for showing news. The central display may therefore include that name or a specific picture or video related to the graphical wheel as a whole.

Figure 2:
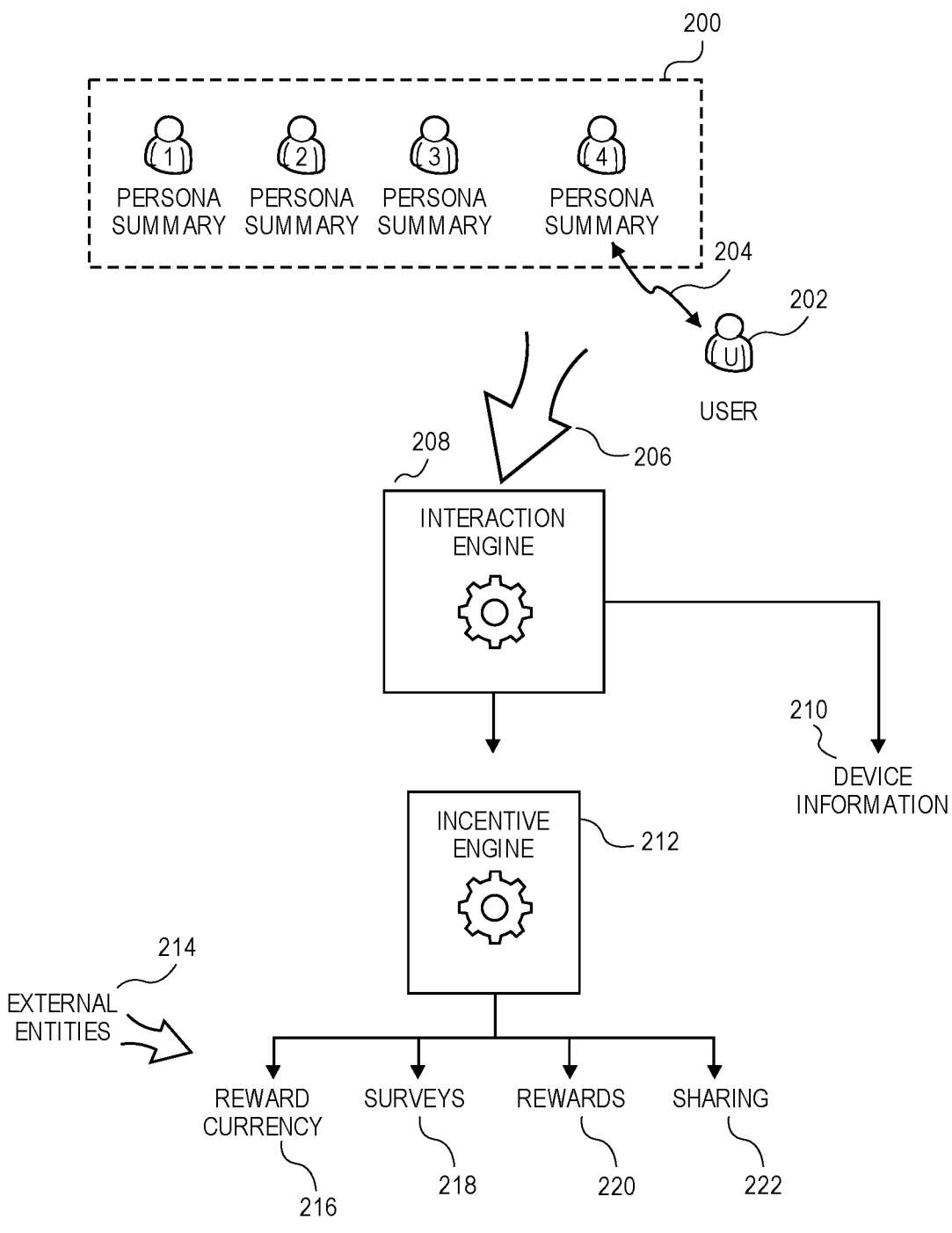
FIG. 2 is a flow diagram illustrating an exemplary embodiment of a user reward system.

Turning to FIG. 2, the user is invited to interact with the system, the wheel, and the personas. Based upon these interactions, the user may be rewarded in various ways to encourage the continued interaction. The system may also generate revenue to support the system.

In Step 200, the persona summaries are displayed to the user, as discussed above in Step 120. In Step 202, the user selects personas for viewing and interaction. The user may select personas by clicking on the desired persona from the wheel, by searching for the desired persona, or by another method. In some embodiments, the user may select the persona by long-pressing or double-clicking on the persona icon. In these embodiments, short-presses or single-clicks may present the notification preview 402 as discussed above.

It should be noted that the user may have a persona related to their own data from the various platforms, but the user persona is typically not displayed to the user in the wheel. The user persona may be displayed to the user upon a request or selection of such. For example, this may allow the user to customize their persona or the display thereof. The user may be allowed to select what data is displayed, where the data is displayed, and how the data is prioritized, or other customizations. This gives the user control over how their persona is displayed to other users of the system. For example, the user may desire that their TWITTER data be displayed prominently, and their FACEBOOK data be hidden unless specifically accessed, and their most recent INSTAGRAM photograph be the background image.

In Step 204, the user interacts with the various personas. For example, in Step 204, the user may view persona summary for Person 4. The interaction may be a comment directed to a certain posting or status; a "like" or other feedback provide to a certain posting, status, or comment; a sharing of a certain posting, status, or comment; a creation of original content to the persona; a linking or sharing of content to the persona; a direct message or comment sent to the persona; or other similar interaction with the persona. In some embodiments, the interaction may also include viewing or browsing the persona.

In Step 206, the information regarding the interaction are sent to, received by, or otherwise acquired by an interaction engine. In some embodiments, the interaction engine is actively monitoring activity on the system to identify interactions. In other embodiments, the interaction engine receives an information about the various interactions from the interface engine. The interface engine may send or log updates to the information for later analysis. For example, the information utilized by the interaction engine may be determined from the metadata of the various new content or interactions performed by the user.

Metadata associates one set of data with another set of data. The metadata may be embedded in the content, stored externally in a separate file that is associated with the content, otherwise associated with the content, or all of the above. Embedding the interaction information in the content can be advantageous because it allows the metadata to travel as part of the data it describes. In some such embodiments, metadata is associated with particular updates, statuses, or other content. This is advantageous where, for example, the same content may include more than one interaction. In other such embodiments, the metadata is associated with the persona as a whole. Externally stored metadata may also have advantages, such as ease of searching and indexing. The metadata may also be stored in a human-readable format, such that a user can access, understand, and edit the metadata without any special software.

In Step 208, the interaction engine observes, records, and tracks interactions between the user and the various personas. The interaction engine may also update the various platforms based upon the interactions. For example, if the user provides an interaction with Persona 4 based upon content from Platform C, the interaction may send information indicative of the interaction to Platform C. Platform C may receive the content via the API (discussed above) and update the content on Platform C accordingly. In some embodiments, the interaction engine may also send the content to other platforms (such as Platform A and Platform B, as illustrated in FIG. 1). As such the various platforms remain current and content rich. In other embodiments, the content data of the interaction is sent a plurality of platforms. This enhances the data sharing among the platforms and provides additional content to the platforms.

In Step 210, the interaction engine receives information about various devices that the user is utilizing to interact with the system. In displaying and interacting with content, the system analyzes device information for the user. In some instances, the device information is derived from the device that accesses the system, from previous devices used by the user, from an indication from the user of the types of devices that they possess and are interested in being associated with the system, etc.

In some instances, the device information includes information indicative of a laptop or desktop computer. Laptop and desktop computers typically provide for the display of more information and faster processors for the computation of data and the presentation of media. In some embodiments, the device information includes information indicative of a tablet computer. Some tablet computers (as well as laptop computers) may have periods without Internet connectivity due to the lack of a mobile broadband connection, which may affect the types of notifications and communication that they can facilitate.

In some embodiments, the device information includes information indicative of a smart phone. Examples of information formatted for a smart phone can be seen in FIGS. 4 and 5. The smart phone information (as well as other device information) can include usage statistics, such as screen-on time, active interaction time, call time, texts per day. In some embodiments, the device information includes information indicative of a wearable technology such as a smart watch or the like. Wearable technology provides convenience for notifications, but limited computing power, screen size, and Internet access.

In some embodiments, the device information includes network information for the device or devices. The type of network, as well as the bandwidth of the network, may affect the type and size of information presented to the user. For example, based upon the bandwidth, the system may download more information and present it to the user. In some embodiments, the device information includes information related to the operating system of the device or devices. Certain operating systems may enable certain versions of the software, certain features may be supported by some operating systems but not by others, etc. This could include local applications of embodiments of the invention, web browsers utilized to access the system, and other methods of contacting and interacting with the system.

In some embodiments, the device information may include information indicative of other applications or computer programs present on the device or devices. The system may interact with, receive information from, or utilize the other applications in the determination of appropriate data to be added to personas. For example, if the device is a smart phone, the system may analyze the games installed on the phone to select a survey game that would likely appeal to the user.

In Step 212, information from the interaction engine is sent to, received by, or otherwise acquired by the rewards engine. The rewards engine provides incentives for the user to interact with the system. As opposed to other systems of the prior art in which users are only presented with basic advertisements, the rewards engine encourages interaction instead of relying on the content alone to generate interest and interaction in the system. The rewards engine encourages and rewards interaction, while generating revenue for the system.

In embodiments of the invention, the rewards engine essentially performs the following steps: receiving information about the user, analyzing information about the user, providing rewards currency to the user based upon interactions, providing surveys to the user to gather more information, providing discounts and other rewards to the user based upon the answering of the surveys and/or the rewards currency. In this way, the rewards engine gathers more specific qualitative and quantitative data about the user (as discussed below) that is of more value to companies. This additional data is therefore used to provide an even more specific targeting plan for the advertiser to reach the user. In some instances, the rewards provided bring even more information about the user and/or others, based upon how, when, where the reward is utilized and whether the reward is shared (and, if so, with whom).

In Step 214, external entities interact with the rewards engine. The external entities will provide the revenue to the rewards engine in exchange for information provided to the external entities, and exposure of the external entities to the user. In embodiments of the invention, instead of inserting advertisements into, beside, or among the content, the rewards engine gathers valuable information about the user from the user. One problem of conventional advertising is the difficulty in measuring effect. An advertiser displays an advertisement on a computer screen and a user either clicks the advertisement or the user does not. The advertisement therefore provides minimal information for the user. For example, it may be unclear upon a user not interacting with the advertisement whether the user did not like the advertisement, did not like the product or services offered, did not like the manner in which the advertisement was displayed, or whether the user liked the advertisement but failed to press for some other reason.

The external entities as discussed can be virtually any person or organization. In some instances, the external entities are companies that desired to advertise to the users and gather valuable information about the users to help them make more targeted offerings. In other instances, the external entities are governing agencies or non-profit organizations attempting to provide information to and gather information from the user. In some embodiments, the external entity may also be the system, such that the system is advertising about itself, the products offered, the services offered, or other information for the user. The system itself may also gather information about the user, the user's preferences, and other qualitative information about the user.

In embodiments of the invention, the rewards engine gathers both quantitative and qualitative information about the user. Quantitative data represents information that can be measured in some fashion. Quantitative data is typically represented by a number along with a unit, such as dollar, days, or interactions. Quantitative data could also be represented by a ration or other unit-less number, such as a ratio of original posts to comments. Quantitative data may also be described in ranges to which the user is categorized, such as a frequent user or an infrequent user. Qualitative data, in contrast, represents something that can be described in some fashion. Qualitative data typically can be observed or understood, but not measured. Qualitative data provides information about the user that may be desirable to the external entities. Qualitative data can include preferences, desires, contemplated future purchases, favorite style of music, favorite sports team, favorite type of food, favorite stores, etc.

In embodiments of the invention, the rewards engine gathers this qualitative and quantitative data to more accurately associate users with external entities to which they may be interested. The qualitative and quantitative information may be used to identify users that external entities may want more information from, that external entities may want to extend specific offers to, or that external entities may want to otherwise interact with. In advertisement systems of the prior art, this qualitative and quantitative information was analyzed to determine which advertisements to show to which users. This "targeted advertisement" was more effective than blanket or random advertising, but still has the inherent shortcomings of advertisements. Embodiments of the invention overcome these shortcomings as described below.

In Step 216, the rewards engine provides reward currency to the user based upon the interactions observed. In some embodiments, the reward currency is awarded to both the user that interacts and the persona that is receiving that interaction. For example, if Person 3 posts original content to Platform A to which the user comments on the system, the system may provide reward currency to both Person 3 and the user for the interaction. Person 3 is rewarded for providing quality content worthy of comments, likes, or other interactions. The user is rewarded for making the interaction. In this way, both the user and the external persons are encouraged to provide quality content and interactions with each other. This builds rich data for the system and the various platforms.

In some embodiments, the rewards currency may be displayed to the user on the GUI. The user may also be invited to spend the reward currency to purchase various items, surveys, or the like, as discussed below. The rewards currency accumulates and accrues based upon the interactions and other award-worthy activities. In some embodiments, the user may also be prompted to spend their rewards currency.

In Step 218, the rewards engine presents surveys to the user for the user to complete. In some embodiments, the survey is purchased by the user using their rewards currency in exchange for a discount or other reward (as discussed below). In some other embodiments, the survey may be available to the user regardless of the amount of reward currency that the user currently has.

In some embodiments, the survey is designed to resemble a game, a puzzle, or other similar structure. In these embodiments, the survey is designed to be quick and fun to complete, so that the user can finish the survey with minimal effort or frustration. For example, the survey may ask questions related to a hypothetical vacation. The questions may include types of destinations, lengths of the trip, prices for various services, methods of travel, and other information about the vacation. As another example, the survey may present the user with a new good or service and ask the user how much the user would pay for that good or service. The survey may also include questions such as the desired topics and information that can be presented, incentives that the user might be interested in, games and avatars that might appeal to the user, preferred method of contacting the user, etc.

The user answers are then provided to the external entity. In some embodiments, the external entity may be provided with information about the user that completed that survey. The provided information can include demographic information about the user, qualitative information, quantitative information, contact information, and other information about the user. The system may also present an option to the user to send certain data to the external entity. The option may include a level of information that will be sent to the external entity. The level of discount or other rewards may depend on the amount of information shared with the external entity in addition to the survey results. This is because the survey results become more valuable when the external entity has a better idea of the person that completed the survey. In some embodiments, the user has already agreed to share a certain level of information with all external entities that present surveys, such as when the user account is setup (as discussed below).

In some embodiments of the invention, the surveys are completely optional for the user. The user completes the surveys to access the discounts and other rewards discussed below. In these embodiments, the user is incentivized to complete the surveys to access the discounts and other rewards. In other embodiments, the surveys may be mandatory. For example, the user may be presented with the survey upon accessing the system. As another example, the amount of rewards currency may be capped. As such, the survey is not mandatory per se, but the user is encouraged to complete the surveys so that they continue to accrue reward currency.

In Step 220, the user is presented with a discount or other reward. In embodiments of the invention, the reward may have a monetary value, a value for goods, a value for services, a credit toward a previously-owed debt. The reward could also be an attempt to sell goods to the user at a discounted rate, an attempt to sell services to the user for a discounted rate, an attempt to buy goods or services from the user, an attempt to enter into a contractual relationship with the user, or other benefit to the user.

The specific reward for the user may be selected based on any of numerous criteria. The specific reward may be targeted to the user based upon known qualitative and quantitative data, as generated by interaction engine or other sources, responses to previous rewards, etc. In some embodiments, the specific reward may also be determined based upon the geographic location of the user and/or the external entity. For example, by accessing geographic information from the user device, the system may present the user with a reward that can be utilized near the user's current location. In some embodiments, the user may be presented with categories or specific offers to choose from. The categories may provide an indication of what the user is looking for. This provides qualitative information about the user. For example, if the user selects a category that they want a discount on electronics, this information may be useful not only to the external entity that provides the discount, but to other external entities at the same time or in the future.

An example of a discount is presented in FIG. 5. As illustrated, the discount provides information about the external entity providing the discount, what the discount is, where the discount can be utilized, personas with whom the discount can be or has been shared (as discussed below), a redemption code, expiration information, and other information. In the example shown in FIG. 5, the discount provides a $50 in-store credit for switching wireless carriers. FIG. 5 also shows three persona icons with whom the discount has been shared by the user.

In some embodiments of the invention, the rewards currency serves numerous purposes. The points can also be redeemable for cash, gift certificates, and purchases at certain retail establishments. The points may be transferred to an external system for redemption, or may kept internally. For example, a user may be able to purchase the survey that leads to a reward for a low amount of reward currency, or the user may be able to purchase the reward directly for a high amount of reward currency. Because the reward in itself can provide benefits to the external entity, as discussed below, the system can still generate revenue by providing the reward directly to the user without the survey. In this way, the user has another option whether or not to complete the survey. For a savings of reward currency, they can complete the survey and receive the same award.

In Step 222, the user is invited to share the reward with others. This provides the external entity with additional information about potential customers that may be interested in their products or services. The sharing of the discount or other reward provides even more information about the user and/or the persons with which the discount is shared. The sharing may be performed internally to the system or externally to the system. For example, the user may know, based upon the user's personal knowledge, that Person 1 would be interested in the good or service offered in the reward. Based upon this personal knowledge, the user selects to share the reward with Person 1. The user may do so by selecting Person 1 from a list, entering the name associated with Person 1, or performing a similar task. The system may also offer suggested personas that may be interested in the good or service. This allows the system to refine its selections based upon whether the user agrees that the person would be interested in that reward.

Upon logging in to the system, the person receiving the shared reward may be notified or presented with the reward. This builds comradery among the users of the system and encourages the person to complete the surveys to receive their own rewards (which may then be shared with still other people, such as the original user). In this way the web of information, interaction, and sharing continues to grow.

As discussed above, the rewards engine also monitors to determine when, if, how, and where the reward is utilized. This may be based upon the external entity providing an indication that the reward has been utilized, an indication from the system that the user has utilized the reward (such as by ordering a certain good or service), or the like. For example, if the reward is not shared this may be indicative that the reward is not considered as valuable. If the reward is shared, this may be indicative that the individuals with which it was shared may be interested in the product or service offered. In this way, the external entity is asking the user who else among the personas that the user is associated with would enjoy the benefits of the reward. This option provides valuable insight to the external entity on other new customers.

In embodiments of the invention, the system monitors the award to determine if the award is utilized by either the user or the personas with whom it was shared. The indication that the reward was utilized can come from the user, the external entity, and/or the system itself. For example, the discount code shown in FIG. 5 is a specific and unique code provided to the user. The discount codes shown to the shared personas and/or other users provided the same discount maybe different. In this way, the usage of the code can be tracked. In other embodiments, the reward may include a link to a website or other electronic resource from which the user can access the reward. The system may then therefore determine whether the user followed the link and made the purchase.

In some embodiments of the invention, the rewards currency method described herein is used to fully fund the system. In these embodiments, there are no visible advertisements anywhere on the GUI. This provides an aesthetically pleasing layout and a good user experience. Instead of inserting advertisements among the normal user-generated content (as is common in the prior art), the rewards currency is utilized to generate the revenue necessary to fund the system. The rewards currency system provides additional information about the user and other people that may be interested in the products or services of the external entity. For this reason, the rewards currency system may be more valuable to external entities than traditional electronic advertising, in which the "click-through" rate is among a very few measurable statistics for measuring the effectiveness of the advertisement. By providing more valuable content to the external entity, less advertising is needing to be shown to the user, which increasing the user experience and encourages the user to perform more interactions. The more interactions lead to even better information for the external entity.

Another data set that may be included in the user information is social media information. Social media information could include a number or frequency of posts, pictures posts, shares, likes, friends, new friends, un-friends, hashtags, tweets, favorites, retweets, categories, pages, etc. The social media information can also include the devices from which the user accesses the social media, the number and frequency of use, the average amount of time spent, etc. The system may access the social media information by providing a login screen to the user via the system. The system will then (with the permission of the user) log into the social media on behalf of the user and may remain logged in so as to track activity. The system may also access the information via the social media API, as discussed above.

Figure 6:
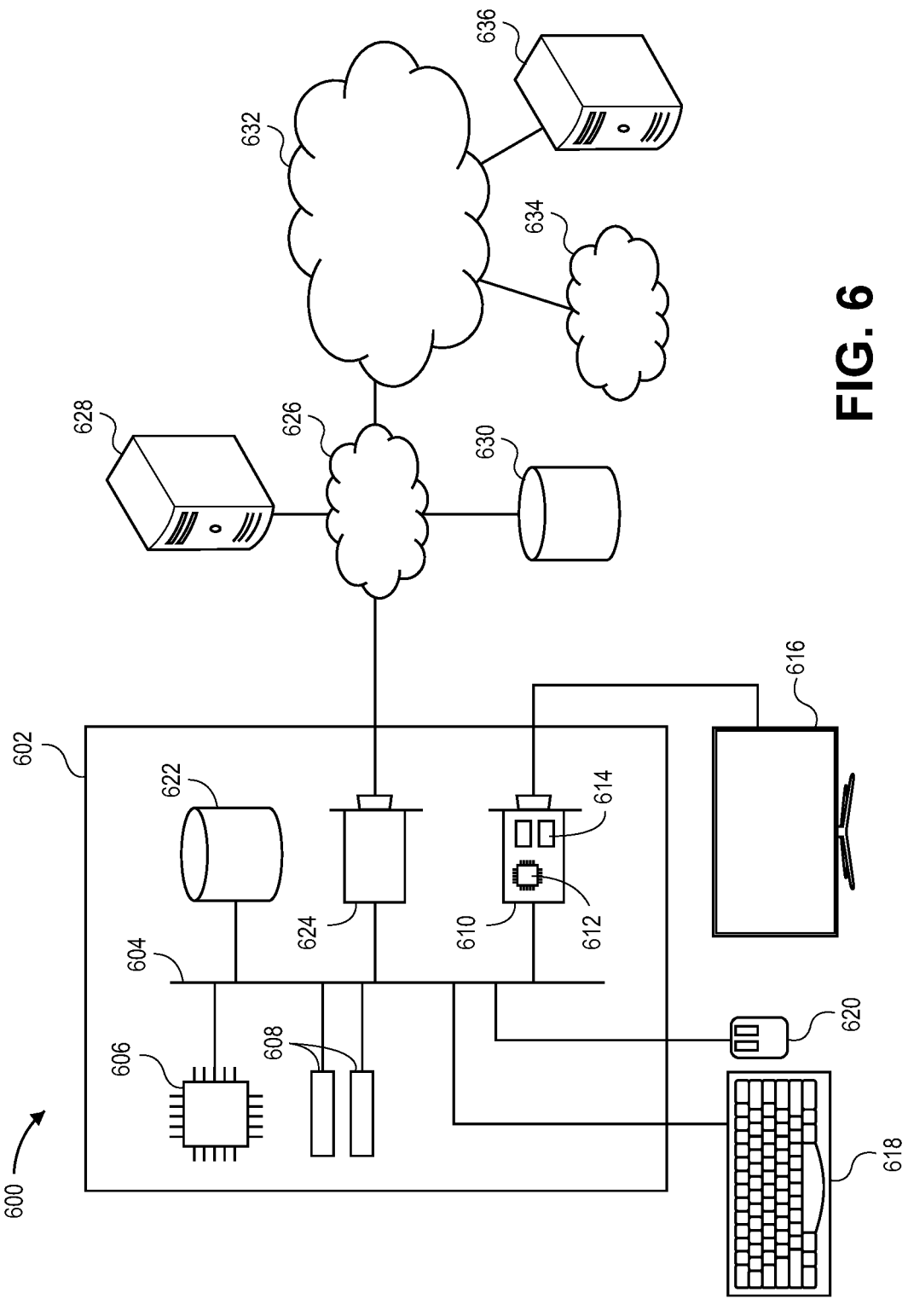
FIG. 6 is a system diagram of an embodiment of the invention depicting various computing devices and their components.

Turning to FIG. 6, the physical hardware that makes up the system will now be discussed. The system 600 comprising an exemplary hardware platform that can form one element of certain embodiments of the invention is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608.

Also attached to system bus 604 is graphics card 610. In some embodiments, graphics card 604 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Local network 626 is in turn connected to Internet 632, which connects many networks such as local network 626, remote network 634 or directly attached computers such as computer 636. In some embodiments, computer 602 can itself be directly connected to Internet 632.

The computer program of embodiments of the invention comprises a plurality of code segments executable by a computing device for performing the steps of various methods of the invention. The steps of the method may be performed in the order described, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using a user engagement system, which broadly comprises server devices, computing devices, and a communications network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, smart watches, other smart wearables, and the like, or combinations thereof. Various embodiments of the computing device may also include voice communication devices, such as cell phones and/or smart phones. In some embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments of the invention.

In embodiments of the invention users may be provided with different types of accounts. Each type of user account may provide their respective users with unique roles, capabilities, and permissions with respect to implementing embodiments of the invention. For instance, a user may be provided with a user account that permits the user to access embodiments of the invention that are applicable to accessing and interacting with platforms. In addition, any number and/or any specific types of accounts is provided as may be necessary to carry out the functions, features, and/or implementations of the invention. Upon a user logging in to the electronic resource for a first time, the user may be required to provide various items of identification information to create their respective accounts. Such identification information may include, for instance, personal name, business name, email address, phone number, or the like. Upon providing the identification information, the user may be required to enter (or may be given) a username and password, which will be required to access the electronic resource.

Execution of the computer program of embodiments of the invention performs steps of the method of embodiments of the invention. Because multiple users may be updating information stored, displayed, and acted upon by the computer program, information displayed by the computer program is displayed in real-time. "Real-time" as defined herein is when the processing element of the system 10 performs the steps less than every 1 second, every 500 milliseconds, every 100 milliseconds, or every 16 milliseconds.

The method of embodiments of the invention for providing the GUI broadly comprises the following steps: accepting user input, updating information in response to user input, providing an updated GUI. Initialization of the computer program by a user, as may occur when a new user begins to use the system, includes the following additional steps: prompting for the user login, retrieving the credentials input by the user, and determining the first screen of the GUI to provide to the user. Additional steps are also performed if the user has never used the system before, namely prompting the user to create a login and verifying the login is available.

The method of embodiments of the invention for providing the secondary GUI broadly comprises the following steps: accepting user input, updating information in response to user input, and providing an updated GUI. Each time the user opens the computer program comprises the following additional steps: verifying the credentials of the user, determining the first screen of the GUI to provide to the user. The secondary GUI is deployed in response to the message sent to the user so creating a login does not need to be performed.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. One or more non-transitory computer-readable media comprising computer-executable instructions that, when executed by at least one processor, perform a method for aggregating information from at least one platform of a plurality of platforms to present to a user, comprising:

receiving a plurality of information items from the at least one platform of the plurality of platforms;

categorizing the plurality of information items from the at least one platform into a plurality of categories, wherein each category from the plurality of categories is associated with at least one application functionality;

creating a persona associated with a category of the plurality of categories, wherein the persona is associated with an application functionality of the category;

selecting a plurality of personas to be placed on a graphical element, the plurality of personas comprising the persona;

presenting the user with the graphical element comprising the persona;

responsive to the user selecting the persona, presenting the user with the application functionality associated with the persona, wherein the application functionality allows the user to interact with the persona;

receiving information indicative of the user interacting with the persona; and responsive to receiving the information indicative of the user interacting with the persona, transmitting content associated with the user interacting with the persona to the at least one platform of the plurality of platforms.

2. The one or more non-transitory computer-readable media of claim 1, wherein the method further comprises:

continuously receiving, at a predetermined interval, additional information items from the at least one platform; and categorizing the additional information items from the at least one platform into the plurality of categories.

3. The one or more non-transitory computer-readable media of claim 1, wherein the method further comprises:

presenting the user with a persona icon associated with the persona; and responsive to the user selecting the persona icon, presenting the persona to the user.

4. The one or more non-transitory computer-readable media of claim 1, wherein the method further comprises:

responsive to an interaction with a graphical wheel, rotating the graphical wheel such that additional personas are presented to the user, wherein the graphical element is the graphical wheel.

5. The one or more non-transitory computer-readable media of claim 1, wherein the method further comprises:

receiving a user input corresponding to an interaction by the user with the application functionality of the persona.

6. The one or more non-transitory computer-readable media of claim 5, wherein the method further comprises:

responsive to the interaction, transmitting content to the at least one platform such that the at least one platform is updated based on the content.

7. The one or more non-transitory computer-readable media of claim 5, wherein the method further comprises:

prior to receiving the interaction, presenting an incentive to the user, wherein the incentive encourages the user to interact with the persona; and responsive to receiving the interaction, providing the user with a reward.

8. A method for aggregating information from at least one platform of a plurality of platforms to present to a user comprising:

receiving a plurality of information items from the at least one platform of the plurality of platforms;

categorizing the plurality of information items from the at least one platform of the plurality of platforms into a plurality of categories, wherein each category from the plurality of categories is associated with at least one application functionality;

creating a first persona associated with a first category of the plurality of categories, wherein the first persona corresponds to a first application functionality;

creating a second persona associated with a second category of the plurality of categories, wherein the second persona corresponds to a second application functionality;

selecting a plurality of personas to be placed on a graphical element, the plurality of personas comprising the first persona and the second persona;

presenting the user with the graphical element comprising the first persona and the second persona;

responsive to the user selecting the first persona, presenting the user with the first application functionality corresponding to the first persona, wherein the first application functionality differs from the second application functionality corresponding to the second persona;

receiving information indicative of the user interacting with the first persona; and responsive to receiving the information indicative of the user interacting with the first persona, transmitting content associated with the user interacting with the first persona to the at least one platform of the plurality of platforms.

9. The method of claim 8, further comprising:

receiving, at predetermined intervals, additional information items from the at least one platform;

analyzing the additional information items to determine at least one category from the plurality of categories to associated with the additional information items; and updating the at least one category with the additional information items.

10. The method of claim 8, further comprising:

updating the plurality of personas displayed on a graphical wheel based on an interaction of the user with the first persona, wherein the graphical element is the graphical wheel.

11. The method of claim 8, further comprising:

indicating, to the user, a recency of the information associated with the first persona, the recency associated with a time in which the first persona was updated with additional information.

12. The method of claim 8, further comprising:

ordering the plurality of personas on a graphical wheel based on recency of the information associated with each persona from the plurality of personas, wherein the graphical element is the graphical wheel.

13. The method of claim 8, wherein each persona from the plurality of personas is associated with an application within the at least one platform.

14. The method of claim 8, wherein the at least one platform is a social media platform and the information is associated with a social media account of the user.

15. A system for aggregating information from at least one platform of a plurality of platforms to present to a user comprising:

a consolidation engine configured to receive external information items from the at least one platform of the plurality of platforms;

a persona engine configured to categorize the external information items into a plurality of categories;

an interface engine configured to display to the user a graphical element; and one or more non-transitory computer-readable media comprising computer-executable instructions that, when executed by at least one processor, perform a method for aggregating the external information items, comprising:

categorizing, by the consolidation engine, the external information items from the at least one platform into the plurality of categories, wherein each category from the plurality of categories is associated with at least one application functionality;

associating, by the persona engine, a first persona with a first category from the plurality of categories, wherein the first persona is associated with a first application functionality of the first category;

selecting a plurality of personas to be placed on the graphical element, the plurality of personas comprising the first persona and a second persona associated with a second category from the plurality of categories, wherein the second persona is associated with a second application functionality of the second category;

presenting, by the interface engine, the user with the graphical element comprising the first persona and the second persona;

responsive to the user selecting the first persona, presenting the user with the first application functionality corresponding to the first persona, wherein the first application functionality differs from the second application functionality;

receiving information indicative of the user interacting with the first persona; and responsive to receiving the information indicative of the user interacting with the first persona, transmitting content associated with the user interacting with the first persona to the at least one platform of the plurality of platforms.

16. The system of claim 15, wherein the method further comprises:

responsive to an interaction with a graphical wheel, hiding the first persona and presenting the second persona to the user, wherein the graphical element is the graphical wheel.

17. The system of claim 15, wherein the method further comprises:

extracting, via the consolidation engine, additional information items from the at least one platform;

updating the first persona with the additional information items; and indicating, to the user, a presence of the additional information items associated with the first persona.

18. The system of claim 15, wherein the plurality of personas is selected based on a role associated with the user.

19. The system of claim 18, wherein the role of the user prevents a selection of a third persona associated with a third category from the plurality of categories.

20. The system of claim 15, further comprising:

a reward engine configured to provide the user with an incentive and a reward based upon an interaction, wherein the reward includes a rewards currency configured to accrue based upon additional interactions.

<div align="center">* * * * *</div>